United States Patent [19]

Schotten

[11] 4,272,376
[45] Jun. 9, 1981

[54] FILTER PLATE SHIFTING APPARATUS

[75] Inventor: Alfons Schotten, Düren, Fed. Rep. of Germany

[73] Assignee: Eberhard Hoesch & Söhne GmbH & Co., Düren, Fed. Rep. of Germany

[21] Appl. No.: 133,987

[22] Filed: Mar. 26, 1980

[30] Foreign Application Priority Data

Apr. 10, 1979 [DE] Fed. Rep. of Germany ....... 2914448

[51] Int. Cl.³ .............................................. B01D 25/12
[52] U.S. Cl. .................................................. 210/230
[58] Field of Search ........................ 210/224, 230, 231

[56] References Cited

U.S. PATENT DOCUMENTS

| 3,567,027 | 3/1971 | Kurita | 210/230 |
|---|---|---|---|
| 3,915,863 | 10/1975 | Busse et al. | 210/230 |
| 4,172,792 | 10/1979 | Heinrich et al. | 210/230 |
| 4,184,960 | 1/1980 | Schotten | 210/230 |
| 4,197,199 | 4/1980 | Gribbin | 210/230 X |

Primary Examiner—Thomas G. Wyse
Attorney, Agent, or Firm—Spencer & Kaye

[57] ABSTRACT

A filter press includes a plurality of filter plates displaceable parallel to the filter press length towards the open side and in an opposite direction towards the closed side of the filter press and a filter plate shifting apparatus for individually moving the momentarily outermost filter plate from the closed side towards the open side. The filter plate shifting apparatus includes a filter plate drive extending parallel to the filter press length and being movable parallel to the filter press length towards the open and closed sides, a carrier element mounted on the filter plate drive for force-transmittingly engaging a projection of the outermost filter plate for shifting it away from the filter plate stack towards the open side when the filter plate drive is moved in the direction of the open side and a locking arrangement for pressing the next-to-the-outermost filter plate against the filter plate stack during an initial part of the travel of the outermost filter plate entrained by the carrier element during the motion of the filter plate drive towards the open side. The locking arrangement is mounted on the carrier element for limited displacement relative to the carrier element in a direction parallel to the filter press length and for movement together with the carrier element towards the closed and the open sides.

12 Claims, 7 Drawing Figures

FILTER PLATE SHIFTING APPARATUS

BACKGROUND OF THE INVENTION

This invention relates to an apparatus for shifting the filter plates of a filter press. The apparatus has at least one plate drive which extends in the length dimension of the filter press and which is displaceable in the opening direction and in the closing direction of the filter press. On the plate drive there is mounted a carrier element which is provided with a lug and which can be swung into an operative, force-transmitting engagement with a projection forming part of each filter plate when shifting thereof is to be effected.

An apparatus having the above-outlined broad characteristics is described, for example, in U.S. Pat. No. 3,915,863. According to this patent, the filter plates can be locked to one another at both the open and the closed side of the filter press for the purpose of, for example, ensuring a reliable separation of the filter plate to be shifted from the filter plate stack even if the filter plates tend to stick to one another or separate, dependent upon the behavior of the filter cake. It is a significant disadvantage of such known apparatus that each filter plate has to be provided with its own locking device; this involves substantial expense regarding structure, assembly and maintenance. It is a further disadvantage of the known apparatus that the locking hook of the filter plate to be shifted is released only when the plate drive has already been moved in the opening direction of the filter press, so that in addition to the forces which are generated by the filter cake and which urge the filter plates away from one another, a further pulling force appears which stresses the locking device before the respective filter plate is unlocked.

SUMMARY OF THE INVENTION

It is an object of the invention to provide an improved apparatus of the above-outlined type which is simpler and operationally more reliable than structures known heretofore.

This object and others to become apparent as the specification progresses, are accomplished by the invention, according to which, briefly stated, the carrier element mounted on the filter plate drive has, on that side which is oriented towards the projections of the filter plates, a locking element which is displaceable relative to the carrier element parallel to its direction of travel. Further, the locking element can also pivot on the carrier element and is provided with a lug adapted to engage the filter plate projections in the closing direction of the filter press. The locking element also has an extension oriented in the opening direction of the filter press. The extension, measured from the lug, is longer than the distance between two projections of immediately adjoining filter plates. Further, to the locking element there is articulated a spring element, the other end of which is secured to the filter plate drive.

The invention as outlined above has the advantage that the filter plates need no locking devices since the locking (immobilization) of the filter plate stack is effected, during the filter press opening step, by the filter plate shifting apparatus itself. This is so because during the return motion of the locking element, the latter first runs under the projection of the outermost filter plate (that is, the filter plate to be then transported) of the filter plate stack and abuts against the projection of the next-to-the-outermost filter plate. Since the filter plate drive continues to move into the closing direction, the spring element is tensioned and thus that part of the filter plate stack which is bounded by the next-to-the-outermost filter plate is compressed. Thus, as soon as the carrier element has arrived into engagement with the projection of the outermost filter plate to be transported and the direction of motion of the filter plate drive is reversed, the filter plate to be transported is separated from the filter plate stack which remains compressed by the spring-loaded locking element. Only when the filter plate being transported has been completely separated from the filter plate stack, is the spring element relaxed and is the locking element entrained by the carrier element in the opening direction of the filter press.

According to a further feature of the invention, the carrier element has a slot-like opening which extends in the direction of travel and which serves to receive the locking element and further, the carrier element is provided with a transverse pin which pivotally supports the lever-shaped locking element by extending through an elongated slot thereof. This arrangement has narrow dimensions and thus has a particularly small spatial requirement, since the carrier element itself is a guiding arrangement for the locking element.

According to a further feature of the invention, the spring element engages the locking element in such a manner that the spring force generates a torque about the pivotal axis of the locking element.

In accordance with a further feature of the invention, the spring element is a coil spring and its point of attachment with the plate drive leads the carrier element, as viewed in the closing direction of the filter press. Such an arrangement has the advantage that, on the one hand, by using a coil spring there is achieved a particularly slender structural configuration and, on the other hand, the spring may be arranged in a great number of ways. The spring element may be a tension spring if the effective decrease of the maximum spring force during the opening step is sufficient to hold together the filter plate stack until the complete release of the filter plate to be shifted. Since coil spring used as tension springs have essentially linear spring characteristics, in the carrier element where the point of affixation of the spring element to the plate drive leads the carrier element in the closing direction, it is feasible to arrange the spring elements as compression springs, so that coil springs or coil springs combined with other spring elements such as spring discs, rubber springs or the like can be used to obtain any desired spring characteristics. Thus, for example, in some instances it may be of advantage to apply to the remaining part of the filter plate stack a relatively large closing force which has to be maintained over a relatively long travelling path in order to ensure that the filter plate to be shifted is completely released from the remainder of the filter plate stack before the retaining force applied by the locking element is allowed to be decreased.

According to a further feature of the invention, the point of affixation of the spring element on the locking element is situated in the zone between the lug of the locking element and the elongated slot so that a torque is exerted on the locking element in such a sense that the lug, as it runs into the filter plate stack, moves securely underneath the projection of the outermost filter plate (that is, the filter plate to be shifted in that particular opening operation).

According to still another feature of the invention, on the filter plate drive there is mounted a pivotal securing element which is arranged as a mirror image of the carrier element and which is situated adjacent the carrier element, at that end thereof which is oriented towards the open side of the filter press. The securing element has the function of maintaining the filter plate, during the shifting motion thereof, form-lockingly between the carrier element and the securing element, so that in case of a sudden stop, caused, for example, by the actuation of emergency brakes, the filter plate does not continue its travel by virtue of its kinetic energy, but is immobilized by the securing element.

According to a further feature of the invention, the securing element pivotally supports an angled lever. One arm of the angled lever bridges over the space between the locking element and the carrier element and is adapted to abut a transverse pin of the carrier element. While it is in principle feasible to effect the pivotal motions required for the latching of the carrier element and the securing element by spring force, the above-outlined arrangement has the advantage that, during the return stroke, the other arm of the angled lever engages the projection of the filter plate to be shifted and upon continued motion of the filter plate drive, the second arm is pivoted and then abuts the transverse pin of the carrier element to swing the latter in a positive manner into the working position. This means that a positive displacement is achieved for the latching of the carrier element immediately prior to the reversal of its said direction of motion, so that faulty control (switching) motions cannot occur.

According to a further feature of the invention, the plate drive is an endless roller chain and is positively guided at least in the operational zone of the carrier element during the opening operation. In this manner it is ensured that the roller chain is securely guided even in case of large spring forces effective between the plate drive and the locking element.

DESCRIPTION OF THE PREFERRED EMBODIMENTS

Figure 1:
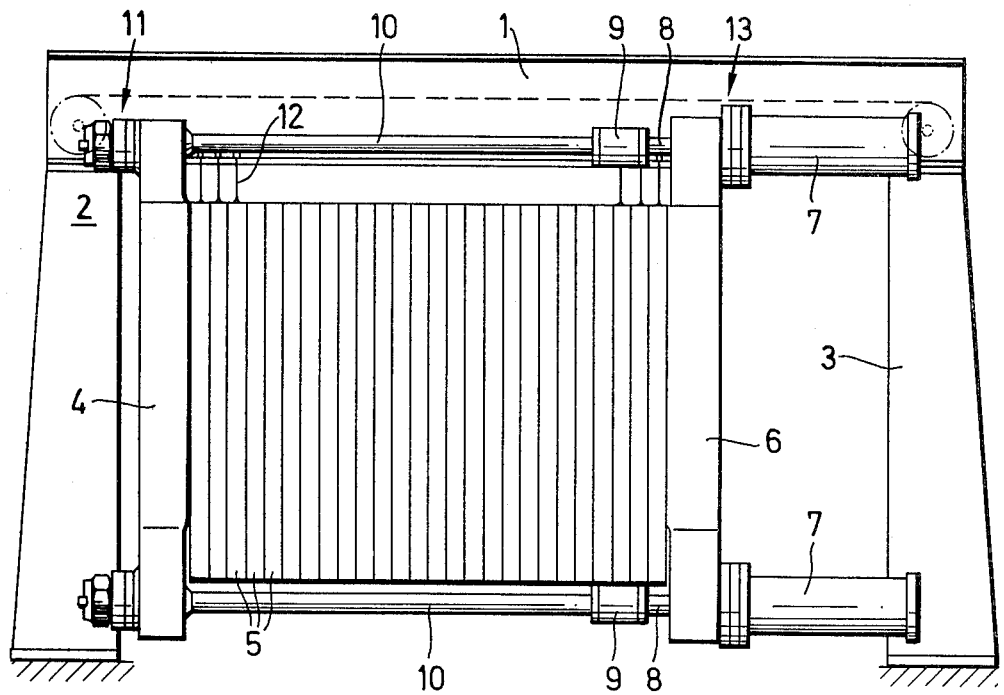
FIG. 1 is a schematic side elevational view of a filter press with upper plate suspension, incorporating the invention.

Turning to FIG. 1, there is shown a plate filter press in its closed state. The filter press has an overhead supporting and guiding beam 1 (hereafter guide beam) which extends in the length dimension of the filter press and which, at both ends, is supported on the floor by uprights 2 and 3. The guide beam 1 may be an I-beam, on the lower flange of which there are suspended an end plate 4, individual filter plates 5 arranged to form a filter plate stack as well as a head plate 6. The guide beam 1 extends centrally over the filter plate stack. The end plate 4 is attached to the guide beam 1 in a stationary manner, whereas the head plate 6 is mounted displaceably on the guide beam 1. The filter plates 5 are suspended from the lower flange of the guide beam 1 by means of schematically illustrated suspensions 12; these provide for a displacement of the individual filter plates in the length dimension of the filter press during opening and closing thereof. Each suspension 12 is provided with a projection (not shown in FIG. 1) which is adapted to assume a force-transmitting relationship with a carrier element of the plate shifting apparatus to be described in greater detail later. By virtue of such an operative interengagement between the respective projection of each filter plate suspension and the carrier element of the plate shifting apparatus, the filter plates can be shifted individually along the guide beam 1 after completion of a filtering process.

Four hydraulic piston-and-cylinder units 7 are mounted in the respective corner zones of the head plate 6. The piston rods 8 of each unit 7 are connected by means of couplings 9 with pull rods 10 which, in turn, are articulated to the end plate 4 by means of respective spherical bearings 11. The piston-and-cylinder units 7 are connected—in manner not shown or described in detail—to a source of hydraulic fluid by means of a hydraulic control system, so that during the filtering process the filter plates 5 are pressed to one another with the required closing pressure and, upon conclusion of the filtering process, the head plate 6 is, from the illustrated closed position, shifted towards the right into the open position.

On the guide beam 1 there is supported, at the height of the suspensions 12, a filter plate shifting apparatus generally indicated at 13, embodiments of which will be described in detail later. By means of the plate shifting apparatus, the filter plates 5 are shifted individually and in sequence, in the direction of the head plate 6 which is then on the open side of the filter press. The purpose of shifting the plates is to prepare for the ejection of the filter cake after the filtering process as well as for the required washing and rinsing steps to be performed on the individual filter plates. Prior to initiating a new filtering process, the filter plates are simultaneously displaced from the open side of the filter press back to the closed side against the end plate 4 by means of the head plate 6 as the latter is being urged into the closed position by the piston-and-cylinder units 7. Thereafter, the required closing pressure is exerted by the units 7 to the filter plate stack between the end plate 4 and the head plate 6.

Figure 2:
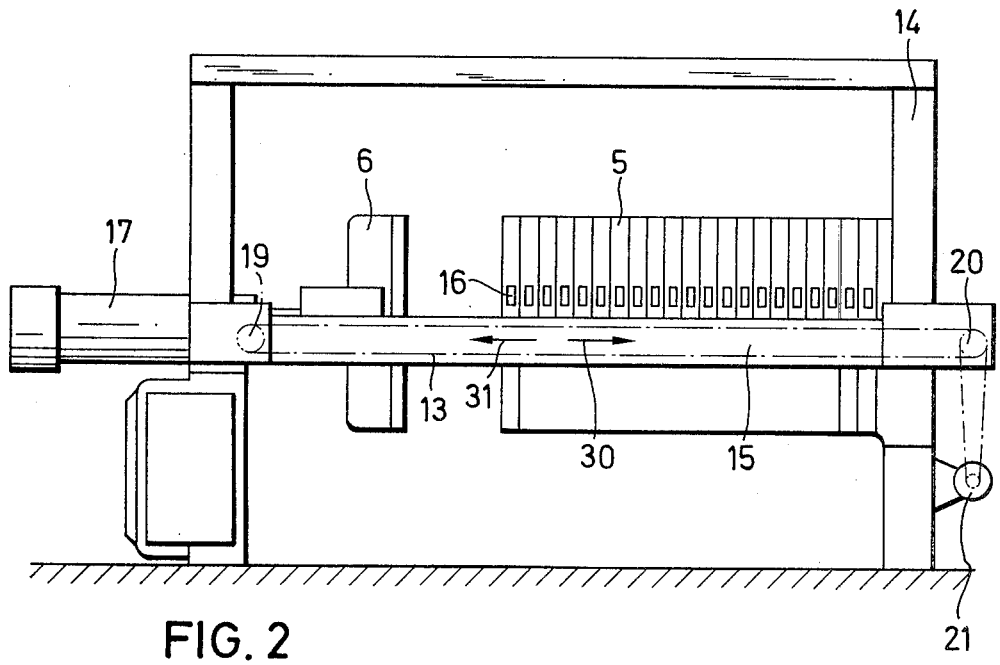
FIG. 2 is a schematic side elevational view of a filter press with lateral plate suspension, incorporating the invention.

Turning now to FIG. 2, in the filter press shown therein, the press stand is on both sides provided with guide beams 15 on which lie the individual filter plates 5 by means of laterally attached projections 16. In this filter press, parallel to each guide beam 15 there is provided a plate shifting apparatus 13 which will be described in detail as the specification progresses. The closing and opening of the filter press is effected by a single hydraulic cylinder 17 extending in the direction of the longitudinal axis of the filter press. In other respects the mode of operation of the filter press according to FIG. 2 corresponds to that illustrated in FIG. 1.

The filter plate shifting apparatus 13 which will be described in conjunction with FIGS. 3, 4, 5 and 6 may find application in either filter press shown in FIGS. 1 and 2. The only difference is that in case of the filter press shown in FIG. 1 the filter plate shifting apparatus extends above the filter plate stack and may have only a single plate drive, the projection 16 comprised in each suspension 12 is oriented upwardly and further, the individual elements of the plate shifting apparatus are operative in a downward orientation. In case of a filter press as generally shown in FIG. 2, both guide beams 15 are provided with a separate plate shifting apparatus in which the individual elements are effective in an upward orientation as they cooperate with the projections 16, by means of which each filter plate lies bilaterally on the guide beams 15. The mode of operation of the individual embodiments of the filter plate shifting apparatus will be described for projections 16 as arranged in a filter press according to FIG. 2.

Figure 3:
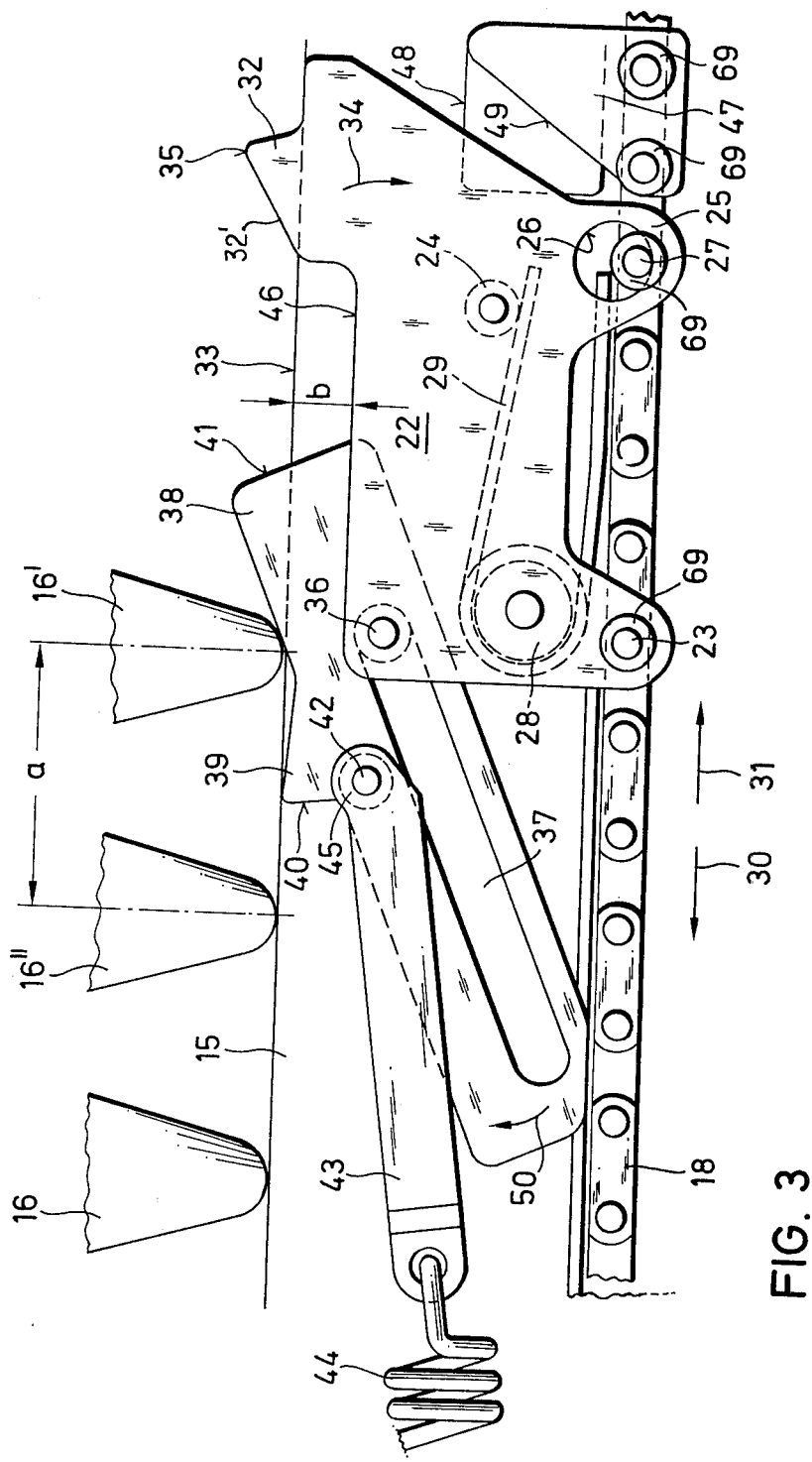
FIGS. 3, 4 and 5 are side elevational views of a preferred embodiment of the invention depicting different operational phases.
Figure 7:
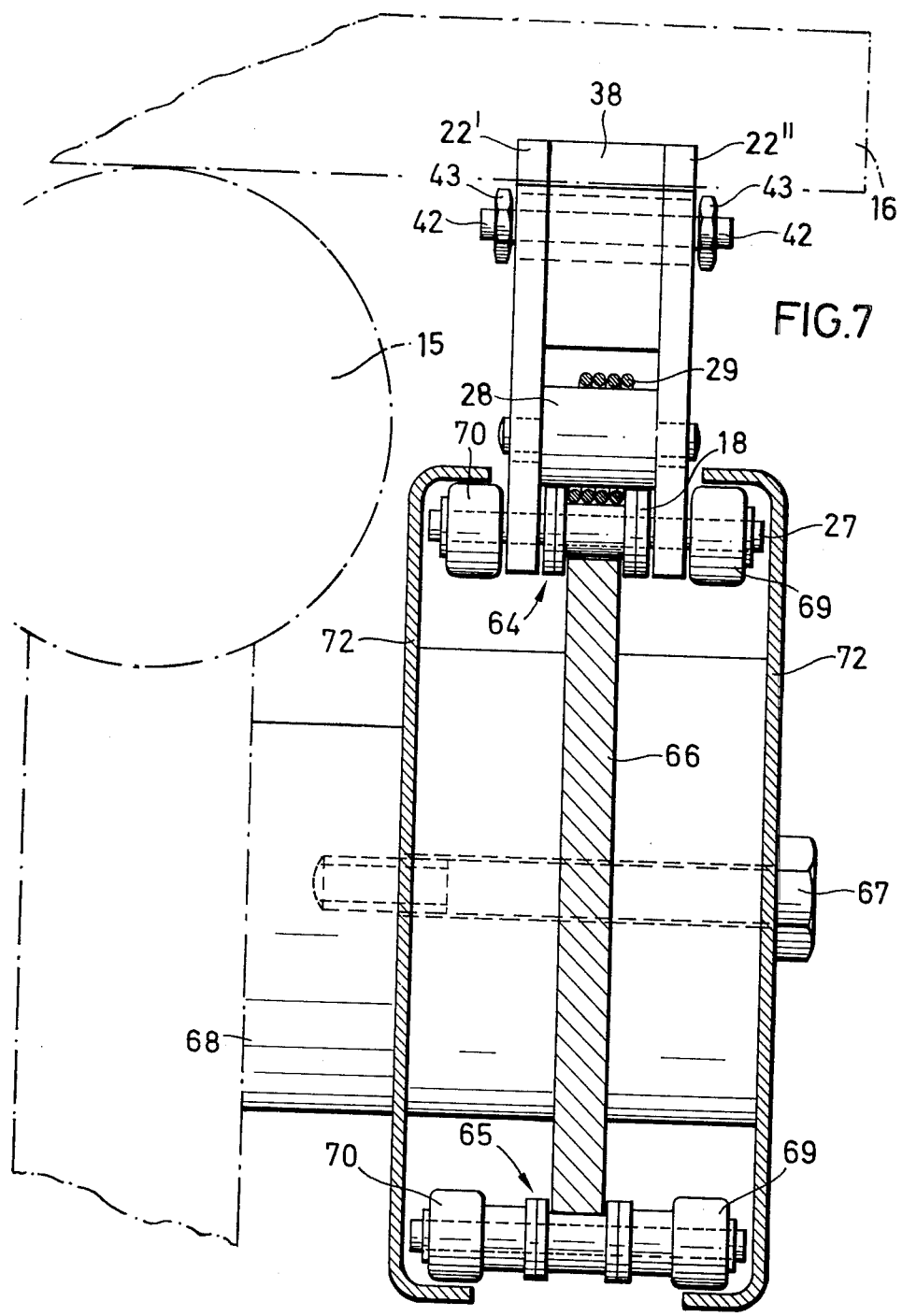
FIG. 7 is a sectional front elevational view of a component forming part of the preferred embodiments.

The general structure of the plate shifting apparatus will now be described with reference to FIG. 3. On each guide beam 15 (only one shown in FIG. 3) the individual filter plates (not shown in FIG. 3) are supported by the individual projections 16 lying on an upper horizontal face of the carrier beam 15. Laterally to each guide beam 15 there extends a filter plate drive, such as an endless roller chain 18 which, as shown in FIG. 2, is trained about deflecting sprockets 19 and 20 at the end of the filter press stand. The roller chain 18 is driven by a motor 21. A carrier element 22 is pivotally mounted on the roller chain 18 by means of a chain link pin 23. The carrier element 22 may be formed, for example, by two parallel plates 22' and 22" as shown in FIG. 7. The two plates are connected to one another by means of the pin 23 as well as a transverse bolt 24. At the side opposite the pivot 23, the carrier element 22 has a protuberance 25, in the zone of which there is provided an opening 26 through which extends, on both sides, another chain link pin 27 forming part of the roller chain 18. The opening 26 and the pin 27 cooperate to limit the pivotal motion of the carrier element 22 about the pin 23. Between the plates 22' and 22" forming the carrier element 22 there further extends a pin 28 about which there is wound a coil spring 29 having one leg which engages the transverse bolt 24 and another leg which engages the rollers of the roller chain 18. Thus, the force exerted by the spring 29 urges the carrier element 22 counterclockwise into a position in which, as shown in FIG. 3, the lower edge of the opening 26 engages the chain link pin 27. The chain 18 may selectively move in the closing and in the opening direction of the filter press, as indicated by the respective arrows 30 and 31.

The carrier element 22 is, at its end oriented towards the opening direction, provided with a lug 32 which, in the position shown in FIG. 3, projects beyond the plane of engagement for the filter plate projections 16, defined by the upper edge 33 of the guide beam 15. The height of the lug 32 on the one hand, and the width of the opening 26, on the other hand, are so dimensioned that upon a clockwise pivotal motion of the carrier element 22 in the direction of the arrow 34 about the pin 23 against the force of the spring 29, the tip 35 of the lug 32 can dip below the level of the engagement plane defined by the upper edge 33 of the guide beam 15.

The carrier element 22 is, in the upper zone of its end oriented towards the closed side (arrow 30) of the filter press, provided with a transverse pin 36 which projects through a slot 37 of a bar-like locking element 38. The locking element 38 has a lug 39, the abutment face 40 of which is oriented into the closing direction (arrow 30) of the filter press. The distance between the abutment face 40 of the lug 39 and the end 41 (oriented towards the opening direction) of the locking element 38 is greater than the distance a between two projections 16 of immediately adjoining filter plates. As a result of such a spacing, the locking element 38, in its locking position as shown in FIG. 5, still engages the projection 16' of the outermost filter plate to be shifted when the lug 39 with its abutment face 40 engages the projection 16" of the next-to-the-outermost filter plate which, during the given operation, is to be held against the remainder of the filter plate stack.

A forked connecting element 43 is articulated by means of a pivot pin 42 to the locking element 38 above the slot 37 in the zone of the lug 39. A spring element 44 is attached to that end of the connecting element 43 which is remote from the pivot pin 42. The inner width of the forked connecting element 43 is so dimensioned that it is adapted to straddle the carrier element 22. The intermediate space remaining at either side of the locking element 38 is filled by spacer sleeves 45 which are inserted on the pin 42 and which simultaneously serve as rollers.

The carrier element 22 has a cutout portion extending from the back side of the lug 32 in the closing direction (arrow 30). The cutout portion has an edge 46 which is at a distance b underneath the engagement plane 33. The distance b is so dimensioned with respect to the spacer sleeves 45 that in the telescoped (nested) position shown in FIG. 5, the lug 39 projects beyond the engagement plane 33 but the end 41 of the locking element 38 is at the most at the same height as the engagement plane 33. In the position shown in FIG. 5, the locking element 38 engages an abutment 47 which is affixed to the roller chain 18. The abutment 47 has, as shown in FIG. 3, an abutment face 48 which cooperates with the locking element 38 and an oblique abutment face 49 which in turn cooperates with the carrier element 22.

Figure 5:
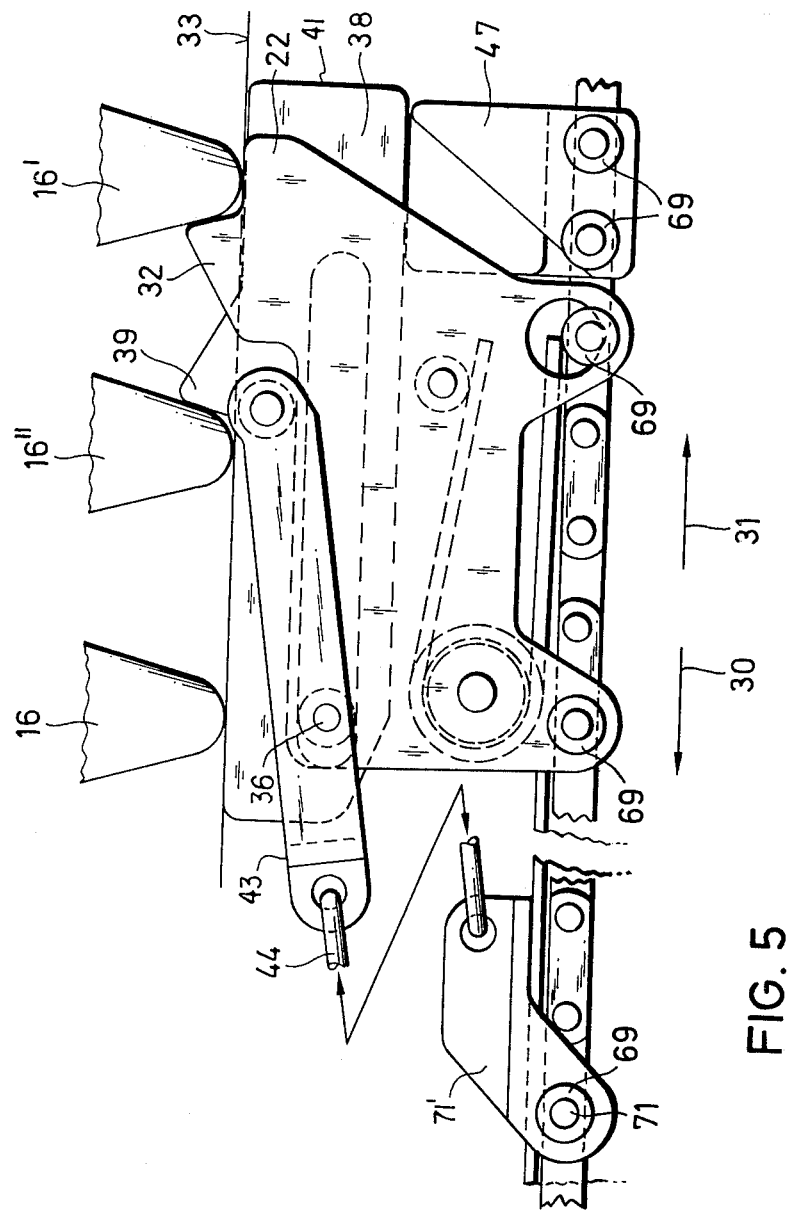

As further shown in FIG. 5, the other end of the spring element 44 is secured to a fork-shaped connecting element 71' which is, by means of a pin 71, articulated to the roller chain 18.

If now the above-described plate shifting apparatus is—after opening the filter press and displacing the head plate 6 to the open side—moved in the direction of the arrow 30 towards the filter plate stack, the individual elements of the filter plate shifting apparatus assume their relative position as illustrated in FIG. 3. Thus, first the locking element 38 arrives, with its end 41 projecting beyond the plane of engagement 33, into contact with the projection 16' of the outermost filter plate first to be transported. Since the locking element 38 is pivotal about the pin 36 of the carrier element 22, upon further shift in the direction of the arrow 30, the locking element 38 swings clockwise in the direction of the arrow 50, so that the lug 39 of the locking element 38 will project beyond the engagement plane 33.

Figure 4:
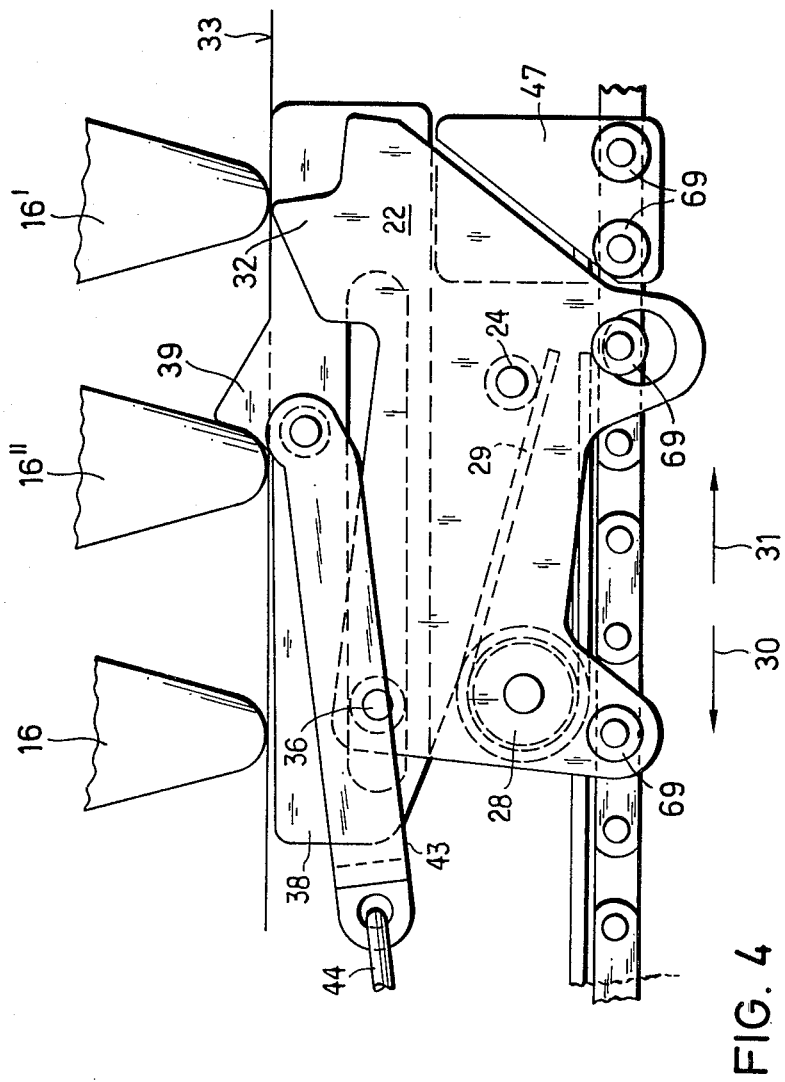

Upon further motion of the plate shifting apparatus in the direction of the arrow 30, the lug 39 of the locking element 38 engages the projection 16" of the next-to-the-outermost filter plate, as illustrated in FIG. 4. If now the roller chain 18 continues to move in the direction of the arrow 30, the locking element 38 is held motionless because of the engagement between its lug 39 and the projection 16", while the carrier element 22, by virtue of the slot 37, can move with respect to the locking element 38 further in the direction of the arrow 30. Since the point of articulation of the tension spring 44 at the roller chain 18 also continues to move, the tension spring 44 is pulled apart and the lug 39 is, with its abutment face 40, urged with an increased force against the projection 16" of the filter plate which is to be retained at the filter plate stack.

During the motion of the roller chain 18 in the direction of the arrow 30, the oblique camming face 32' of the lug 32 engages the lowermost tip of the projection 16', whereupon the carrier element 22 is forced to pivot clockwise until the upper tip 35 of the lug 32 of the carrier element 22 arrives underneath the projection 16' of the outermost filter plate to be shifted. As a result, the spring 29 is compressed (FIG. 4). The roller chain 18 is, together with the carrier element 22, moved in the direction of the arrow 30 until the tip 35 of the lug 32 clears the lowermost tip of the projection 16', whereupon the spring 29 pivots the carrier element 22 counterclockwise and thus the lug 32 arrives in an abutting relationship behind the projection 16' of the filter plate to be shifted, as shown in FIG. 5. If the filter plate shifting apparatus is controlled manually, the power drive for the roller chain 18 is now shut off, the direction of motion reversed, so that the filter plate shifting apparatus can now be moved in the direction of the arrow 31 as the components maintain their position as shown in FIG. 5. As a result, the filter plate to be shifted is, by virtue of the cooperation between the projection 16' and the lug 32 of the carrier element 22 separated from the filter plate stack and shifted in the direction of the head plate 6 which dwells at the open side of the filter press. Upon this occurrence, by means of the lug 39 of the locking element 38 biased by the spring 44, the immediately adjacent filter plate is, by virtue of its projection 16", pressed against the filter plate stack and held thereagainst while the filter plate to be shifted is separated from the filter plate stack and is displaced towards the right in the direction of the arrow 31. The spring force has to be so dimensioned—for example, by experimentation— that it is greater than the retaining force between the two filter plates which are to be separated from one another. In the further course of travel in the direction of the arrow 31, there occurs a relative shift between the carrier element 22 and the locking element 38 until the pin 36 in the slot 37 engages that end of the slot 37 which is oriented towards the open side of the filter press and then the locking element 38 is pivoted counterclockwise under the influence of the now-reduced spring force into the position shown in FIG. 3. The filter plate to be shifted is then moved in the direction of the head plate 6. Thus, the next-to-the-outermost filter plate remains pressed against the filter plate stack during an initial part of the travel of the outermost filter plate.

The above-described opening process is repeated until all the filter plates of the filter plate stack are pulled away from one another and thus re-form the stack at the head plate 6 at the open side of the filter press.

If, as a drive motor for the roller chain 18 a drive motor with overload control is used, such as a hydraulic motor, a gear motor with switchable torque clutch, an electromotor with excess current circuit or the like, the reversal of the driving direction for the plate shifting apparatus may be effected automatically. This is so because if the carrier element 22 is continued to be moved in its position shown in FIG. 5 in the direction of the arrow 30 until the pin 36 engages the terminal edge of the slot 37 oriented towards the closed side of the filter press, the lug 39 of the locking element 38 is pressed with increasing force by means of the roller chain 18 against the projection 16" in the closing sense.

The thus-obtained force increase in the driving system then reverses, by conventional means, the direction of rotation of the drive motor, so that the chain 18 then moves in the direction of the arrow 31 and the above-described shifting step is performed. During the reversing operation the locking element 38 is backed up by the abutment 47 against the force introduced by the lug 39.

In the above-described embodiment, the locking element 38 is biased by the spring element 44 designed as a tension spring, so that the increase of the spring force with which the lug 39 is pressed against the projection 16" is approximately linear. If, for operational reasons, for example, springs with diminishing spring characteristics are to be used, that is, after the engagement of the lug 39 with the projection 16" the force exerted on the projection 16" is to remain approximately constant, spring arrangements stressed for compression may be installed without difficulty.

Figure 6:
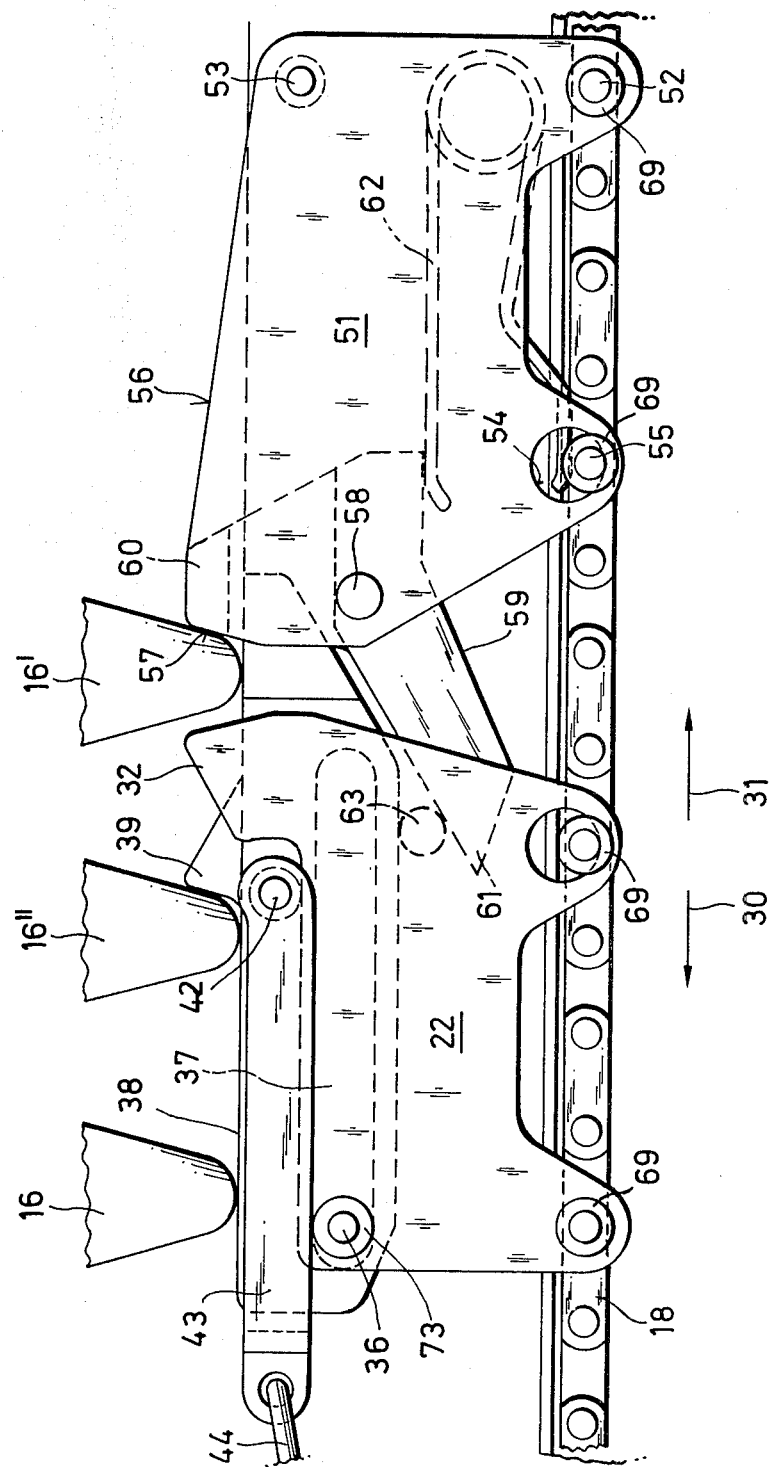
FIG. 6 is a side elevational view of another preferred embodiment of the invention depicting an operational phase similar to that shown in FIG. 5.

Turning now to the embodiment illustrated in FIG. 6, in addition to the carrier element 22 and the locking element 38, there is provided a pivotally mounted securing element 51 which is structured similarly to the carrier element 22 and is arranged as a mirror image of the carrier element 22. Thus, the securing element 51 is formed of two parallel-arranged plates which are connected by a chain link pin 52 of the roller chain 18. The pin 52, at the same time, serves as a pivot for the securing element 51. The two parallel plates of the securing element 51 are further firmly connected with one another by means of a spacer pin 53. The pivotal motion of the securing element 51 is, similarly to the carrier element 22, limited by the cooperation between an opening 54 provided in the securing element 51 and a chain link pin 55 of the roller chain 18 projecting through the opening 54. The upper edge 56 of the securing element 51 is so configured that in the shown working position it slopes upwardly in the closing direction (arrow 30) and it has a steep abutment face 57 oriented in the closing direction. The length of the preferably linear upwardly sloping edge 56 is so dimensioned that it bridges the clearance between two projections belonging to two immediately adjoining filter plates. The height level of the sloping edge 56 and the pivotal range of the securing element 51 are so dimensioned that the edge 56 may be pivoted downwardly to be coplanar with the engagement plane 33 of the guide beam 15. Such a downward (counterclockwise) pivotal motion of the securing element 51 occurs when, upon a travel of the plate shifting apparatus in the opening direction (arrow 31), the securing element 51 runs underneath the projection of that filter plate which is the outermost filter plate of the filter plate stack accumulating on the open side of the filter press at the head plate 6.

An angled lever 59 is pivotally secured by means of a pin 58 to that end of the securing element 51 which is oriented towards the closed side of the filter press. The arm 60 of the angled lever 59 which is situated between the two plates forming the securing element 51, is oriented upwardly and is aligned with the edge 56 of the securing element 51, whereas the arm 61 of the angled lever 59 is oriented in the closing direction of the filter press and bridges the clearance between the securing element 51 and the carrier element 22. In the shown plate transporting position, the arm 61 engages with its end a transverse pin 63 secured to the carrier element 22. A coil spring 62 is arranged within the securing element 51 and engages the roller chain 18 and the arm 60 of the angled lever 59, whereby a torque is exerted on the latter, seeking to rotate the arm 61 in the direction of the roller chain 18.

If now the carrier element 22 is in a position shown in FIG. 4, then in the embodiment according to FIG. 6, the angled lever 59 is pivoted downwardly (counterclockwise) by the spring 62. Upon this occurrence the arm 60 of the angled lever 59 projects beyond the abutment face 57 of the securing element 51. As soon as the projecting part of the arm 60 engages the projection 16' upon further motion of the plate shifting apparatus in the closing direction (arrow 30), upon further motion of the roller chain 18 the carrier element 22 is, after engagement of the arm 61 with the transverse pin 63, positively moved upwardly (counterclockwise) by the angled lever 59 until the arm 60 of the angled lever 59 assumes a coplanar relationship with the abutment face 57 of the securing element 51. In other respects the mode of operation of the embodiment shown in FIG. 6 is identical to the operation of the embodiment described in connection with FIGS. 3, 4 and 5.

In the embodiment according to FIG. 6, the pin 36 projects at both sides beyond the carrier element 22 and is provided at its opposite ends with rollers 73. Then, during motion of the roller chain 18 in the direction of the arrow 30, the forked connecting element 43 runs onto the roller 73 so that under the effect of the spring 44 a torque is applied on the locking element 38 about the pin 36, so that the lug 39 is pressed in the shown position upwardly against the projection 16''.

The advantage of the embodiment shown in FIG. 6 resides in that upon a travel of the filter plate in the direction of the arrow 31, the projection 16' of the filter plate being transported is maintained in a form-locking manner between the carrier element 22 and the securing element 51. Consequently, in case of a sudden stoppage of the plate shifting apparatus, the filter plate cannot continue its travel (propelled by its kinetic energy), but it will be immobilized by the abutment face 57 of the securing element 51.

The embodiment according to FIG. 6 is further very useful if the filter plates, during their travel towards the open side of the filter press, are to be temporarily stopped at a predetermined, precise location prior to reaching their end position at the open side of the filter press, for example, for the purpose of performing a cleaning operation on the individual filter plates. Such a cleaning operation may include a bilateral rinsing of the filter cloth by pressurized water with the aid of a washing device. For such an operation the embodiment according to FIG. 6 has the advantage that with a proper control of the drive motor of the plate shifting apparatus, the filter plate, then in operative engagement with the plate shifting apparatus, can be maintained in a precise, predetermined position, so that a filter cloth washing device can be readily moved into its own assigned position for performing the rinsing operation on the respective filter plate.

Turning once again to FIG. 7, which is a front elevational section of the plate shifting apparatus, the upper flight 64 and the lower flight 65 of the roller chain 17 are supported by an inner web plate 66 which is mounted on the machine frame 68, for example, by threaded bolts 67 (only one shown). In the zone of the carrier element 22, the securing element 51 as well as the articulation 71 of the spring element 44 on the roller chain 18, some of the pins of the roller chain 18, particularly the pins 23, 27 as well as 52 and 55 are extended and provided at their free ends with rollers 69, 70 in a uniform spacing. The roller chain 18 is surrounded on both sides by shroud-like guides 72 of U-shaped cross section, whose lateral legs serve as running faces for the rollers 69, 70 at the upper and the lower flights of the roller chain 18. The web portions of the guide sheet member 72 and the web 66 take up the force components generated transversely to the direction of the motion of the roller chain 18 and particularly the forces generated by the spring element 44, whereby a linear, smooth advance of the roller chain 18 is ensured.

In a filter press built according to FIG. 2, filter plate shifting apparatuses of the above-described structure are arranged on both sides in the zone of the respective guide beam 15; the individual elements of the plate shifting apparatus are mounted on the upper flight of the chain.

In a filter press built according to FIG. 1, a single filter plate shifting apparatus is arranged in the zone of the guide beam 1 extending centrally above the filter plates 5. In this case, the individual elements of the filter plate shifting apparatus are mounted on the lower flight of the roller chain 18 and operate in a downward orientation for cooperation with the upwardly facing projections of the individual suspensions 12 of each filter plate 5.

It will be understood that the above description of the present invention is susceptible to various modifications, changes and adaptations, and the same are intended to be comprehended within the meaning and range of equivalents of the appended claims.

What is claimed is:

1. In a filter press having a length, a closed side and an open side and including a plurality of filter plates displaceable parallel to the filter press length towards the open side and in an opposite direction towards the closed side; the filter plates being adapted to assume at said closed side a mutually contacting relationship to form a filter plate stack in which the filter plate closest to the open side is the outermost filter plate; a projection forming part of each filter plate; a filter plate shifting apparatus for individually moving the momentarily outermost filter plate from the closed side towards the open side; the filter plate shifting apparatus including a filter plate drive extending parallel to the filter press length and being movable parallel to the filter press length towards said open and closed sides; the improvement wherein said filter plate shifting apparatus comprises in combination (a) a carrier means mounted on said filter plate drive for force-transmittingly engaging the projection of the outermost filter plate for shifting it away from said filter plate stack towards said open side when said filter plate drive is moved in the direction of said open side; and (b) a locking means for pressing the next-to-the-outermost filter plate against said filter plate stack during an initial part of the travel of the outermost filter plate entrained by said carrier means during the motion of said filter plate drive towards said open side; said locking means being mounted on said carrier means for limited displacement relative to said carrier means in a direction parallel to the filter press length and for movement together with said carrier means towards said closed and open sides.

2. A filter press as defined in claim 1, further comprising a securing means mounted on said filter plate drive adjacent said carrier means at that side thereof which faces said open side of said filter press for abutting, from said open side, the projection of the outermost filter plate during its travel towards said open side, entrained by said carrier means.

3. A filter press as defined in claim 1, wherein said filter plate drive comprises an endless roller chain; further comprising means for positively guiding said roller chain at least along the zone of operation of said carrier means.

4. A filter press as defined in claim 1, wherein said carrier means comprises a carrier element mounted on said filter plate drive for pivotal movement; said carrier element comprising a first lug arranged to clear the projection of the outermost filter plate by pivotal motion of said carrier element when said filter plate drive is displaced towards said closed side; said first lug being further arranged to force-transmittingly abut the projection of the outermost filter plate when said filter plate drive is moved towards said open side after said first lug has arrived between the projections of the outermost and the next-to-the-outermost filter plates; further wherein said locking means comprises a locking element having mounting means for mounting said locking element on said carrier element for pivotal movement with respect to said carrier element and for limited displacement relative to said carrier element in a direction parallel to the filter press length; said locking element further having a second lug arranged to clear the projection of the outermost filter plate when said filter plate drive is displaced towards said closed side; said locking means further comprising a spring element attached to said locking element and said filter plate drive for urging said locking element in a direction parallel to said filter press length towards said closed side; said second lug being further arranged to force-transmittingly abut the projection of the next-to-the-outermost filter plate after said second lug has cleared the projection of said outermost filter plate, whereby said next-to-the-last filter plate is pressed by said spring element towards said closed side against the filter plate stack during said initial part of the travel of the outermost filter plate away from said stack towards said open side.

5. A filter press as defind in claim 4, wherein said locking element further comprises an extension oriented from said second lug towards said open side; said extension, measured from said second lug, being longer than the distance between the projections of two immediately adjacent filter plates in said filter plate stack; said extension further being arranged for engagement with the projection of the outermost filter plate for pivoting said locking element with said second lug into the path of the projection of the next-to-the-last filter plate after said second lug has cleared the projection of the outermost filter plate during the motion of said filter plate drive towards said closed side.

6. A filter press as defined in claim 4, wherein said spring element comprises a coil spring and further wherein the location of attachment of said spring element on said filter plate drive is closer to said closed side than said carrier element.

7. A filter press as defined in claim 4, said mounting means comprising a slot provided in said locking element and a pivot pin affixed to said carrier element and projecting through said slot; said carrier element having a recess extending parallel to the filter press length for telescopingly receiving said locking element.

8. A filter press as defined in claim 7, wherein the locations of attachment of said spring element on said locking element and on said filter plate drive are positionally so related to said pivot pin that said spring element exerts a torque on said locking element about said pivot pin; said torque urging said second lug out of the path of travel of said projections.

9. A filter press as defined in claim 8, wherein the location of attachment of said spring element on said locking element is situated between said second lug and said slot.

10. A filter press as defined in claim 9, further comprising a securing element mounted on said filter plate drive for pivotal motion as a mirror image of said carrier element; said securing element being situated adjacent said carrier element at that side thereof which faces said open side of said filter press; said securing element being arranged for abutting, from said open side, the projection of the outermost filter plate during its travel towards said open side, entrained by said carrier element.

11. A filter press as defined in claim 10, further comprising a lever pivotally mounted on said securing element; said lever having a first arm arranged to cooperate with said carrier element and a second arm arranged to cooperate, from said open side, with the projection of the outermost filter plate, whereby during the motion of said filter plate drive towards said closed side, said carrier element is, with said first lug, pivoted into the path of travel of said projections by said lever after said first lug has cleared the projection of the outermost filter plate and upon abutment of said second arm with the projection of said outermost filter plate.

12. A filter press as defined in claim 11, further comprising a transverse pin affixed to said carrier element; said first arm being arranged to abut said transverse pin for exerting a torque on said carrier element.

* * * * *